United States Patent
Wnek et al.

(10) Patent No.: US 11,691,231 B2
(45) Date of Patent: Jul. 4, 2023

(54) SYSTEMS AND METHODS FOR MANUFACTURING A STACK TRIM

(71) Applicant: Celeros Flow Technology, LLC, Charlotte, NC (US)

(72) Inventors: Robert Wnek, Cambridge Springs, PA (US); Mark Bober, Erie, PA (US); Brian Jarrett, Waterford, PA (US); David Ristau, Erie, PA (US); Kevin Teygart, Erie, PA (US)

(73) Assignee: Celeros Flow Technology, LLC, Charlotte, NC (US)

( * ) Notice: Subject to any disclaimer, the term of this patent is extended or adjusted under 35 U.S.C. 154(b) by 30 days.

(21) Appl. No.: 17/237,671

(22) Filed: Apr. 22, 2021

(65) Prior Publication Data

US 2022/0339745 A1 Oct. 27, 2022

(51) Int. Cl.
| | |
|---|---|
| *F16K 47/08* | (2006.01) |
| *B23P 15/00* | (2006.01) |
| *B23K 26/34* | (2014.01) |
| *B33Y 80/00* | (2015.01) |
| *B33Y 10/00* | (2015.01) |
| *B22F 10/28* | (2021.01) |
| *B23K 26/21* | (2014.01) |

(52) U.S. Cl.
CPC .......... *B23P 15/001* (2013.01); *B22F 10/28* (2021.01); *B23K 26/21* (2015.10); *B23K 26/34* (2013.01); *B33Y 10/00* (2014.12); *B33Y 80/00* (2014.12); *F16K 47/08* (2013.01)

(58) Field of Classification Search
CPC .......... F16K 47/04; F16K 47/08; F16K 47/16; F16L 55/02736; F16L 55/02781
See application file for complete search history.

(56) References Cited

U.S. PATENT DOCUMENTS

| | | | |
|---|---|---|---|
| 6,039,076 A | 3/2000 | Hemme et al. | |
| 6,926,032 B2 * | 8/2005 | Nawaz | F16K 47/08 137/625.33 |
| 9,528,632 B2 | 12/2016 | Glaun | |
| 2014/0374631 A1 | 12/2014 | Sherrit et al. | |
| 2016/0084038 A1 | 3/2016 | Husveg | |
| 2016/0102781 A1 | 4/2016 | Glaun | |
| 2017/0276252 A1 | 9/2017 | McCaskill | |

FOREIGN PATENT DOCUMENTS

KR 10-2016-0030916 A 3/2016

OTHER PUBLICATIONS

International Search Report and Written Opinion for PCT/US22/24539, dated Jul. 14, 2022.

* cited by examiner

*Primary Examiner* — Michael R Reid
(74) *Attorney, Agent, or Firm* — IceMiller LLP (57) ABSTRACT

A system may be configured to manufacture a layered cage of a trim. Some embodiments may additively manufacture, in each of a plurality of layers, a plurality of channels each having a cross section such that an amount of the layers satisfies a criterion, the cross section being defined by vertical walls, angular portions that extend from the walls, and a shaped top and/or bottom intersecting with angular portions. And the channels of one of the layers may not intersect with any other channel of any other layer of the cage.

10 Claims, 13 Drawing Sheets

SYSTEMS AND METHODS FOR MANUFACTURING A STACK TRIM

TECHNICAL FIELD

The present disclosure relates generally to a method of printing in three-dimensions (3D) an apparatus that controls fluid flow.

BACKGROUND

Figure 1A:
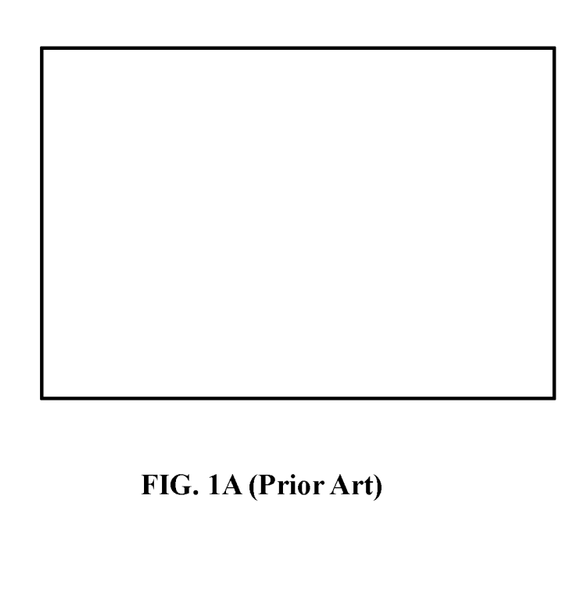
FIGS. 1A and 1B illustrate examples of unprintable and printable shapes, respectively, in accordance with the prior art.
Figure 1B:
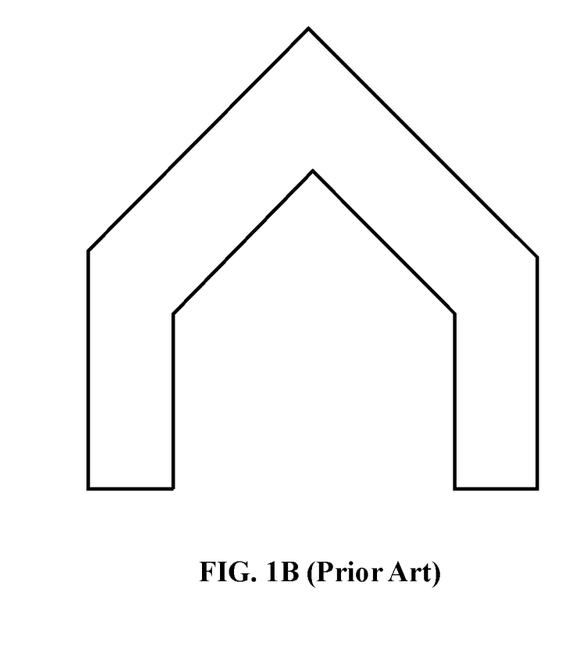
Figure 2A:
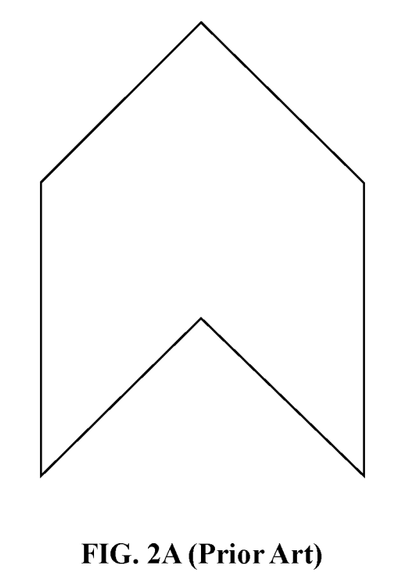
FIGS. 2A and 2B illustrate examples of a channel cross sections, in accordance with the prior art.
Figure 2B:
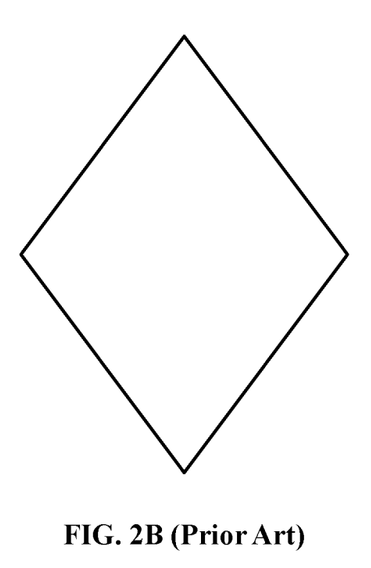

Valves with tubular cages control fluid flow, e.g., by minimizing noise, vibration, and cavitation in channels that are formed between inlets and outlets. The internal elements of a valve are collectively referred to as a valve's trim. Disk stack cages may be fabricated by cutting (e.g., via electrical discharge machining (EDM)) tortuous paths into individual disks and by stacking the disks vertically (e.g., using a brazing and heat treatment process) until a flow requirement is met. Valve components may also be additively manufactured but some features are unprintable, such as the horizontal portion of FIG. 1A. FIG. 1B depicts a shape that may resolve this issue, but it has at least the problem of taking up too much space. FIGS. 2A and 2B depict examples of cross-sectional shapes of a flow channel.

SUMMARY

Tortuous flow paths that extend in a vertical direction over multiple planes cause intersecting paths, which problematically involve fluid communication between layers (e.g., activating a whole trim). Systems and methods are thus disclosed for improved 3D printing of cages, by making flow passageways successfully printable and non-intersecting.

Accordingly, one or more aspects of the present disclosure relate to a method for manufacturing a layered cage of a valve trim. Some embodiments may additively provide, in each of a plurality of layers, a plurality of channels each having a cross section such that an amount of the layers satisfies a criterion, the cross section being defined by at least vertical walls, angular portions that extend from the walls, and a rounded top that intersects with the angular portions. The channels of a first of the layers may not intersect with any other channel of any other layer of the trim.

Implementations of any of the described techniques and architectures may include a method or process, an apparatus, a device, a machine, or a system.

BRIEF DESCRIPTION OF THE DRAWINGS

The details of particular implementations are set forth in the accompanying drawings and description below. Like reference numerals may refer to like elements throughout the specification. Other features will be apparent from the following description, including the drawings and claims. The drawings, though, are for the purposes of illustration and description only and are not intended as a definition of the limits of the disclosure.

DETAILED DESCRIPTION

As used throughout this application, the word "may" is used in a permissive sense (i.e., meaning having the potential to), rather than the mandatory sense (i.e., meaning must). The words "include," "including," and "includes" and the like mean including, but not limited to. As used herein, the singular form of "a," "an," and "the" include plural references unless the context clearly dictates otherwise. As employed herein, the term "number" shall mean one or an integer greater than one (i.e., a plurality).

As used herein, the statement that two or more parts or components are "coupled" shall mean that the parts are joined or operate together either directly or indirectly, i.e., through one or more intermediate parts or components, so long as a link occurs. As used herein, "directly coupled" means that two elements are directly in contact with each other. As used herein, "fixedly coupled" or "fixed" means that two components are coupled so as to move as one while maintaining a constant orientation relative to each other. Directional phrases used herein, such as, for example and without limitation, top, bottom, left, right, upper, lower, front, back, and derivatives thereof, relate to the orientation of the elements shown in the drawings and are not limiting upon the claims unless expressly recited therein.

These drawings may not be drawn to scale and may not precisely reflect structure or performance characteristics of any given embodiment, and should not be interpreted as defining or limiting the range of values or properties encompassed by example embodiments.

Figure 3:
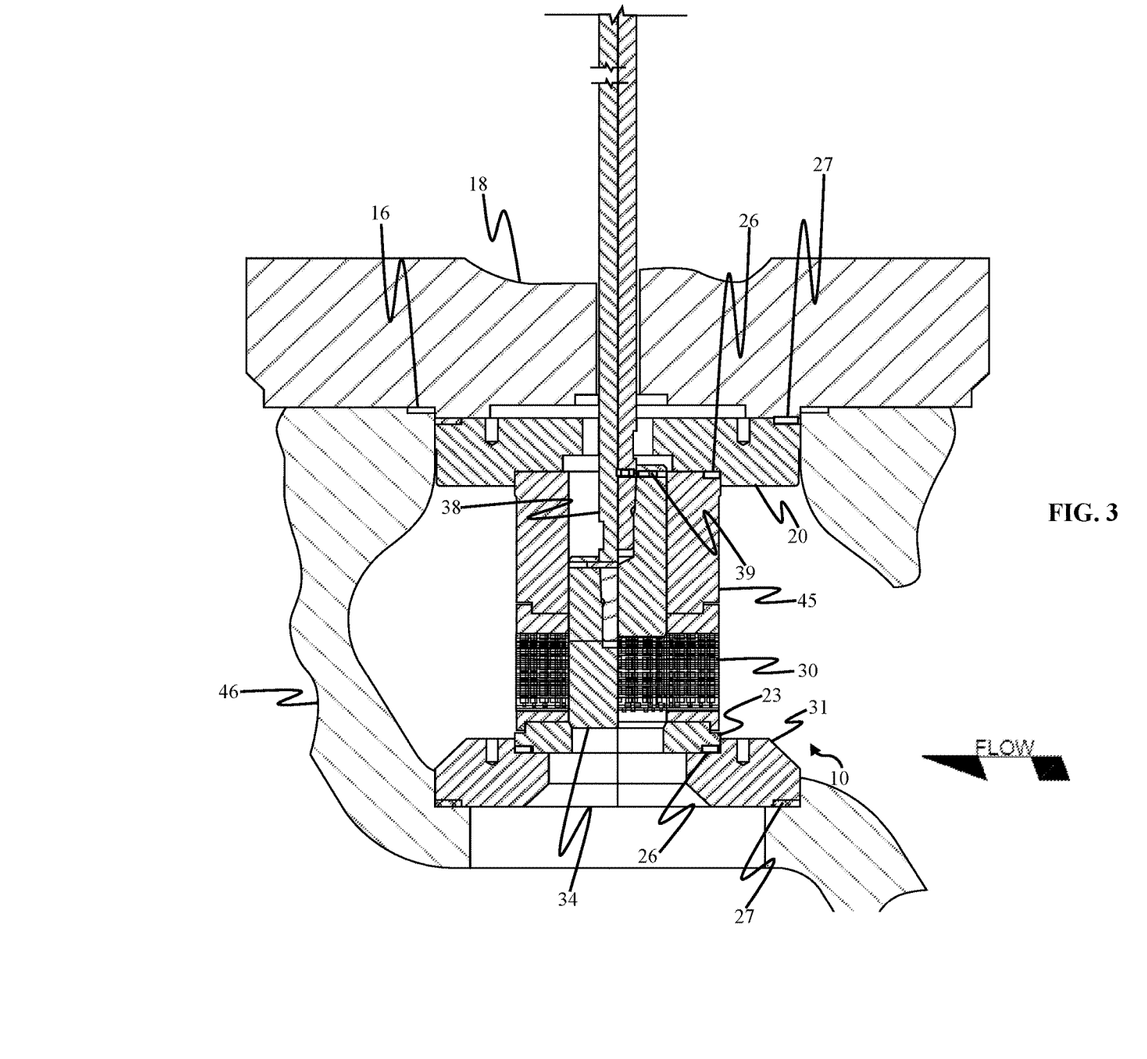
FIG. 3 illustrates an example of a system in which a certain amount of cavitation, erosion, noise, vibration, flow velocity, and pressure are reduced, in accordance with one or more embodiments.

FIG. 3 illustrates trim 10, which may include all depicted structure except valve body 46, bonnet 18, bonnet gasket 16, gasket ring 26, and component 27. In some embodiments, trim 10 may be configured to reduce and attenuate flow velocity (i.e., reduce kinetic energy and/or pressure of fluid via a set of turns formed by obstacles), erosion, noise, vibration, and pressure. Accordingly, there is no need to stack plates or to align them. There is no brazing required so the quality problems that would otherwise ensue from difficult brazing processes are avoided. Some other benefits may include heat treatment, material reduction, lead time reduction, and cost reduction.

There are several benefits to using additive manufacturing to build a cage. For example, the cage may be constructed as one piece and not composed of individual disks. This eliminates the potential for disk separation, which is one of the major failure modes of disk stack cages. Another benefit is that there is very little material loss when using additive manufacturing; traditional methods always waste the material cut away from the manufactured part.

The herein-disclosed trim cage improves at least via a plurality of flow channels having a specific configuration that allows the control element of a valve to be printed. The printing may involve, e.g., a direct metal laser melting process to define the flow channels as void spaces without the need for internal support. Direct metal laser melting is an additive manufacturing technique that uses a laser as the power source to sinter powdered material (e.g., typically metal, such as stainless steel, nickel and cobalt, iron, titanium, aluminum, or combinations thereof). The laser may be automatically aimed at points in space defined by a model, and the material may be bound together to create a solid structure.

Trim cage 30 may thus be manufactured by an additive manufacturing process. One such process is direct metal laser melting. In such a method, material is first laid down in the form of a powdered substance in a series of layers (e.g., having a thickness on the order of microns), such as a metal suitable for the application. A laser then melts or fuses each layer of the laid down powder on a previous laid down layer that melted and solidified. Some other methods are available, and a contemplated design could be produced by methods other than laser melting, such as sintered methods.

Figure 11:
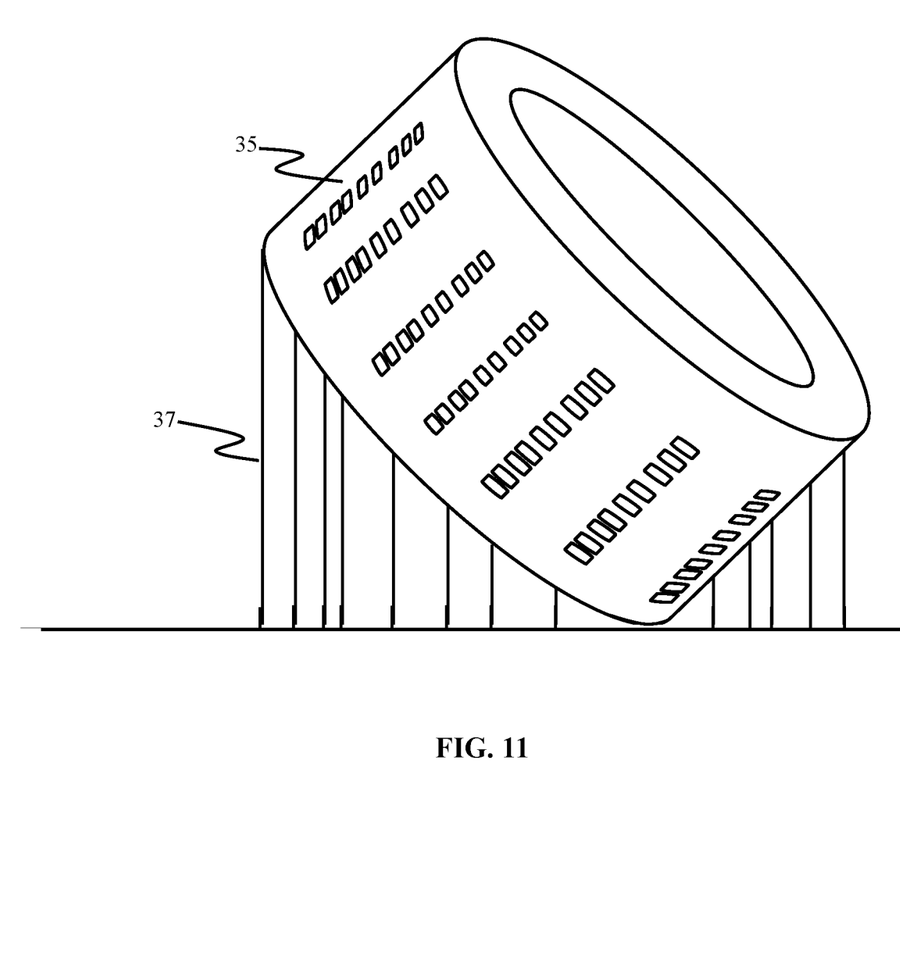
FIG. 11 illustrates an isometric view of a stack of layers 3D-printed on an angle via supports, in accordance with one or more embodiments.

One major limitation of some additive manufacturing processes is its inability to print horizontal unsupported members. This is important when considering a layered stack. In general, the printer may only print in a 45 to 32 degree angle from the horizontal. If the stack is printed with the centerline of the cylinder normal to the build plate, the unsupported, horizontal members will distort greatly. The problem may be remedied, by tilting the stack by a certain angle (as shown in FIG. 11). This causes all horizontal members to be printed as angled members. Printing this way, though, causes numerous printed supports to be required to hold the part due to the bending caused by residual thermal stresses in the part. These supports are wasted and must be machined off the cylindrical cage. Also a height of the built may also increase, and it may become taller; therefore, a printing process is longer and more powder might be required.

FIG. 3 depicts an example of a cross section of trim 10, which is configured to operate in a valve. This valve may comprise bonnet gasket 16, which seals with respect to bonnet 18 and optional cage spacer 20 of trim 10. In this example, cylindrical cage 30 is spaced from spacer 20 via cage spacer 45. And adjacent to spacer 20 may be, e.g., gasket ring 26, there optionally being another gasket ring 26 or seat below cage stack 30. Valve plug 34 may cause operation of the valve, and it may be automatically or manually actuated via stem 38. That is, the plug, which is another cylindrical member, may control or determines which paths are exposed or not exposed. Under cage 30, in the example of FIG. 3, is seat 23. And between the valve and valve body 46 may be, e.g., adapter ring 31. Trim 10 may, in some implementations, include cage spacer 45, cage stack 30, seat 23, valve plug 34, and stem 38.

In some embodiments, the control valve assembly of FIG. 3 may include a valve body, a cage spacer, and a valve plug. In this or another embodiment, the valve body may have an inlet, an outlet, and a conduit extending between the inlet and the outlet. The trim cage may, e.g., be a generally cylindrical member that has a plurality of flow channels and be disposed within the conduit. The cage spacer may hold the cage in the valve body within the conduit of the valve body. The valve plug may closely fit within the cage and be movable relative to the cage. The valve plug may be adapted to be coupled to an actuator. The actuator may control reciprocal displacement of the valve plug between a closed position and an open position. Upon movement of the valve plug towards the open position, fluid may be free to flow through the plurality of flow channels in the cage that correspond with the opening (i.e., not all channels of the cage are open unless the valve plug is moved to the completely open position). When a single layer is open, all the channels on that layer are open. Herein, a channel may be each passage in a layer as shown in FIG. 4.

Cage 30 may have a substantially tubular shape with a longitudinal central axis. The cage may be formed as a unitary or one-piece component, which provides advantages over previously known plate-type (or disk-type) cages.

Figure 4:
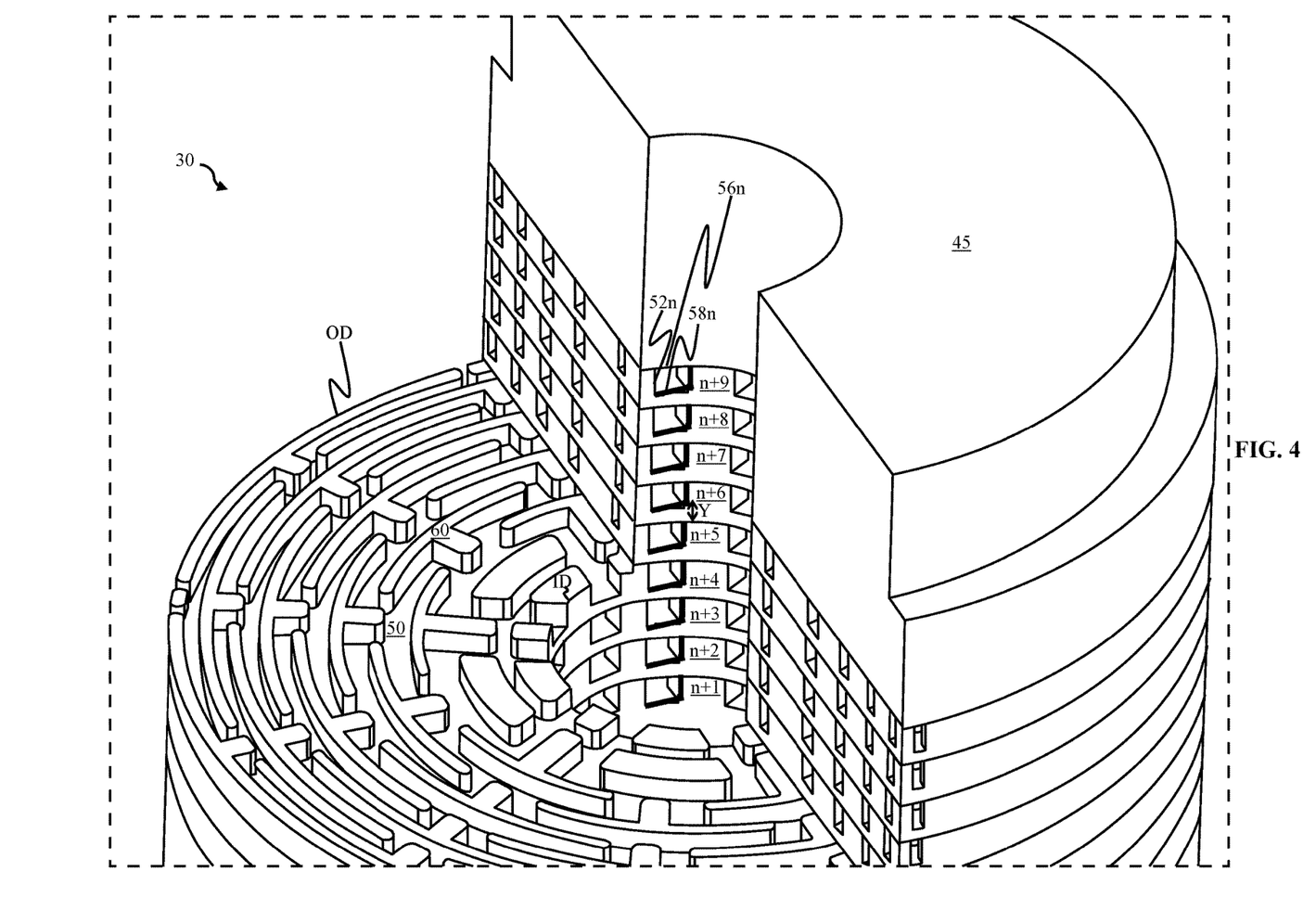
FIG. 4 illustrates an isometric view of a cage stack, in accordance with one or more embodiments.
Figure 5:
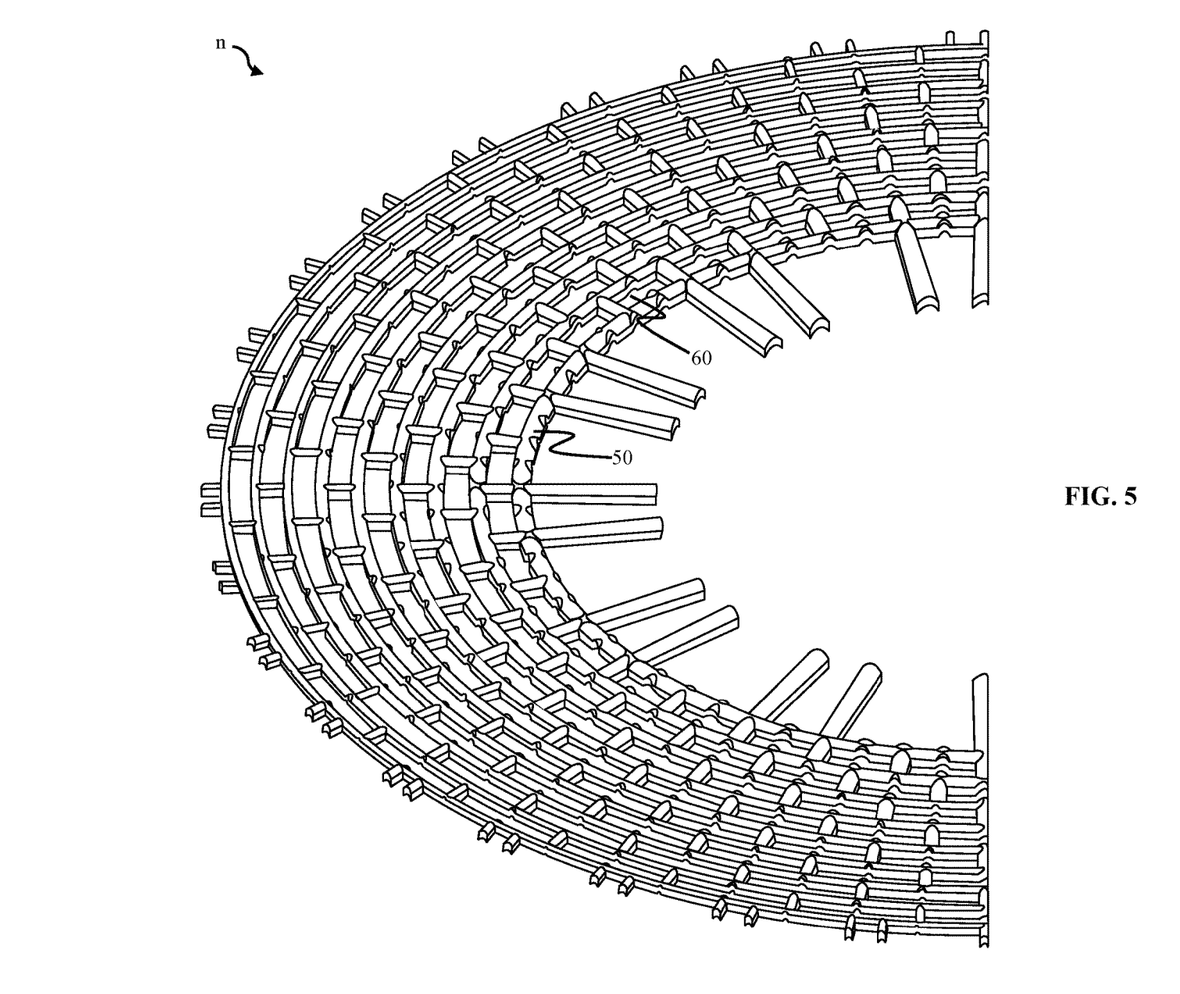
FIG. 5 illustrates an isometric view of a layer of a 3D-printed cage stack, in accordance with one or more embodiments.
Figure 9:
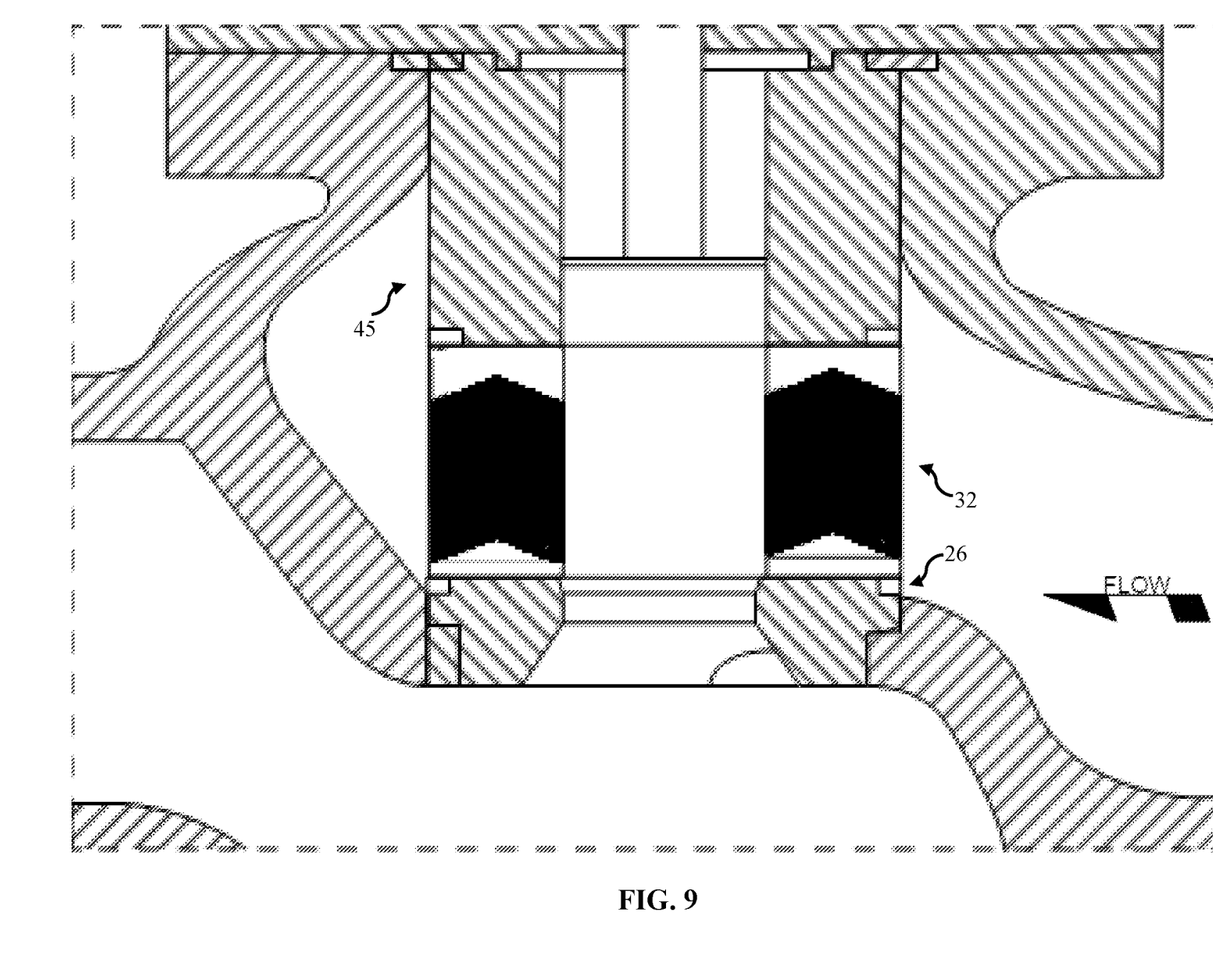
FIG. 9 illustrates a cross-sectional view of a 3D-printed cage installed in a system, in accordance with one or more embodiments.
Figure 10:
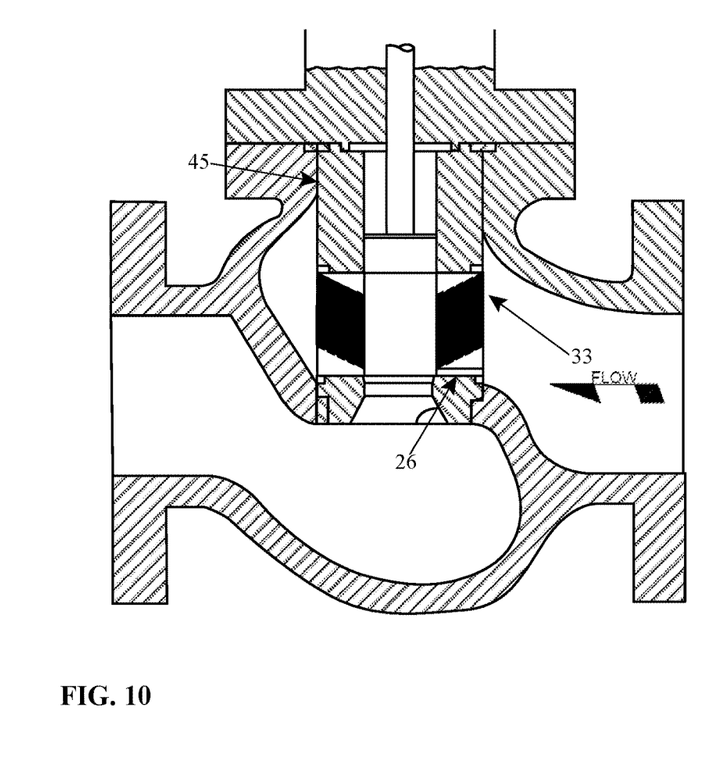
FIG. 10 illustrates different views of another 3D-printed cage installed in a system, in accordance with one or more embodiments.

FIG. 4 depicts an example cut out of cage 30, to show channels 50 traversing each of a plurality of layers n. Channels 50 may communicatively extend from an inner diameter (ID) to an outer diameter (OD) and face angular obstacles 60. These obstacles may be formed of a solid substance (e.g., metal or another suitable material) and have portions that extend at angles (e.g., right angle or another suitable angle). And such angular obstacles may cause horizontal direction changes of the flow path. In some embodiments, flow is directed in radial and circumferential directions within a given layer n. The direction of fluid flow in the flow channels is generally in a radially outward or inward direction starting from inlets of the inner or outer surface, respectively, as depicted in FIGS. 4-5. Flow channels 50 form a labyrinth structure that causes fluid to horizontally flow in a path, as further depicted in FIG. 5. FIGS. 9-10 do not follow the horizontal flow path. The flow path may be in an angle with respect to the inlet and outlet of the valve. While a certain number of columns and another number of circumferentially arranged rows of flow channels are illustrated in cage 30 of FIG. 4, it will be apparent that any suitable number of columns and circumferentially arranged rows of flow channels may be utilized.

Figure 6:
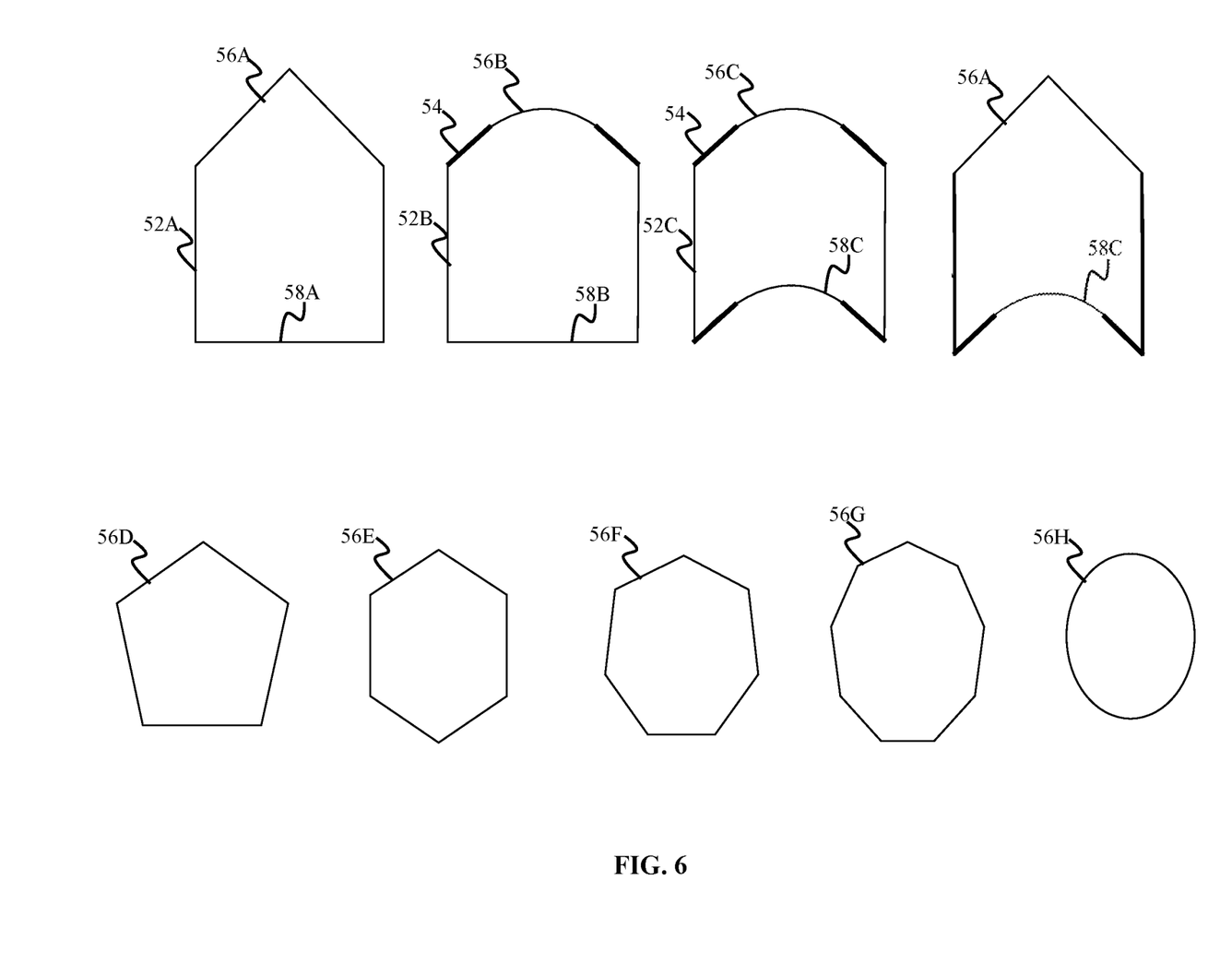
FIG. 6 illustrates a variety of cross-sectional views of flow channels, in accordance with one or more embodiments.

Although FIG. 4 depicts rectangular channels (e.g., having vertical walls $52n$, flat top $56n$, and flat bottom $58n$), alternatively contemplated embodiments may have a channel portion (e.g., top or bottom) circularly defined with a predetermined radius and/or a channel portion angularly defined with an acute angle, as depicted in FIG. 6. This radius may progressively increase such that the rounded top or bottom approaches flatness.

FIG. 4 further depicts layers n directly stacking each other, e.g., with a separation distance Y that satisfies a manufacturability criterion. In some embodiments, the thickness Y of layer n may be independent and result in no interconnection with adjacent layers; in other embodiments, there may be an interconnection between adjacent layers. This may generally be the case for a smaller valve, each layer being independent. For example, a 20 inch design may actually interconnect adjacent layers. Instead of moving from side to side on each horizontal layer, each turn moves up and down. There may be a minimum Y wall thickness requirement that may also depend on structural requirements. There may also be a minimum Y thickness, e.g., dictated by the metal 3D printer capability (printer resolution). Making Y too small may, e.g., be difficult to EDM or machine. Y may not change the characteristics of the flow. What changes the characteristics of the flow may be, e.g., the number of layers, the number of channels, and the number of total turns. For example, path 50 shows around sixteen 90 degree turns; this example also has a total of twelve channels and nine layers. The Y height would have an effect of digitizing the Cv curve, as the plug will be moving in between layers. As thus can be seen in the example of FIG. 4, a thin layer (e.g., of metal) may separate any two layers, e.g., each having a height that is less than (i) a height of a channel portion (e.g., of walls 52*n*, roof 56*n*, or a combination of these) or (ii) another value, such that when any 2 or more adjacent layers are directly stacked there is no interconnection of channels between the different layers. The layers of FIG. 4 may each extend from ID to OD via a set of turns (or vice versa from OD to ID).

Contemplated benefits include being able to print more cages per each additive manufacturing run, reducing waste, reducing printing duration, reducing the amount of required metal support, automating parametric designs, having a more optimal surface finish (e.g., to reduce energy), having more obstructions or obstacles 60 to remove energy and thus increase efficiency, reducing machining time, and reducing engineering time.

The example of FIG. 5 depicts flow paths 50 of a planar layer, without traversing any adjacent layer(s) above and/or below. The pattern of FIG. 5 may be duplicated in all layers of cage 30, or different flow characteristics may be implemented in different layers, e.g., with certain passageways 50 being filled with metal (allowing the channels to stack tightly and produce a different overall flow characteristic).

FIG. 5 further depicts channels 50 in which a fluid makes its way via a set of turns from ID to OD or from OD to ID.

The examples of FIG. 6 comprise cross sections of a channel. The channel may be defined by (i) roof 56A that may extend linearly from uppermost portions of parallel walls 52A with a suitable angle having a vertex at the top, (ii) curved roof 56B that may connect with angular portions or rays 54, which may extend linearly from uppermost edges of vertical walls 52B, (iii) curved roof 56C that may connect with angular portions or rays 54, which may extend linearly from uppermost edges of vertical walls 52C, (iv) pentagon 56D, (v) hexagon 56E, (vi) heptagon 56F, (vii) nonagon 56G, (viii) circle or oval 56H, or (ix) another suitable shape. In this or another example, the channel definition may have flat bottom 58A, 58B, or it may have rounded bottom 58C. A benefit of many of these shapes, including at least the flat bottom ones, is that a flow area may be maximized and a size of trim 10 may be minimized (e.g., when compared to at least the shape of FIG. 2A). With at least those channel cross sections having a flat bottom, a same or more fluid area may traverse the channel (when compared to others that do not have such bottom) such that a number of channel layers is reduced. For example, a number of the layers may be reduced by an extent that satisfies a criterion. In these or other examples, the channel cross section may have a rounded top and/or a rounded bottom to smooth out the flow characteristic, to nest layers, and/or to reduce turbulence. In any of the example shapes of FIG. 6, any suitable dimensions (e.g., for a height and width) may be used for the flow channel cross section. Further contemplated is any combination of shapes, such as a combination of rounded walls of shape 56H being combined with either 56A roof or two 54 lines and 56C roof.

Figure 7A:
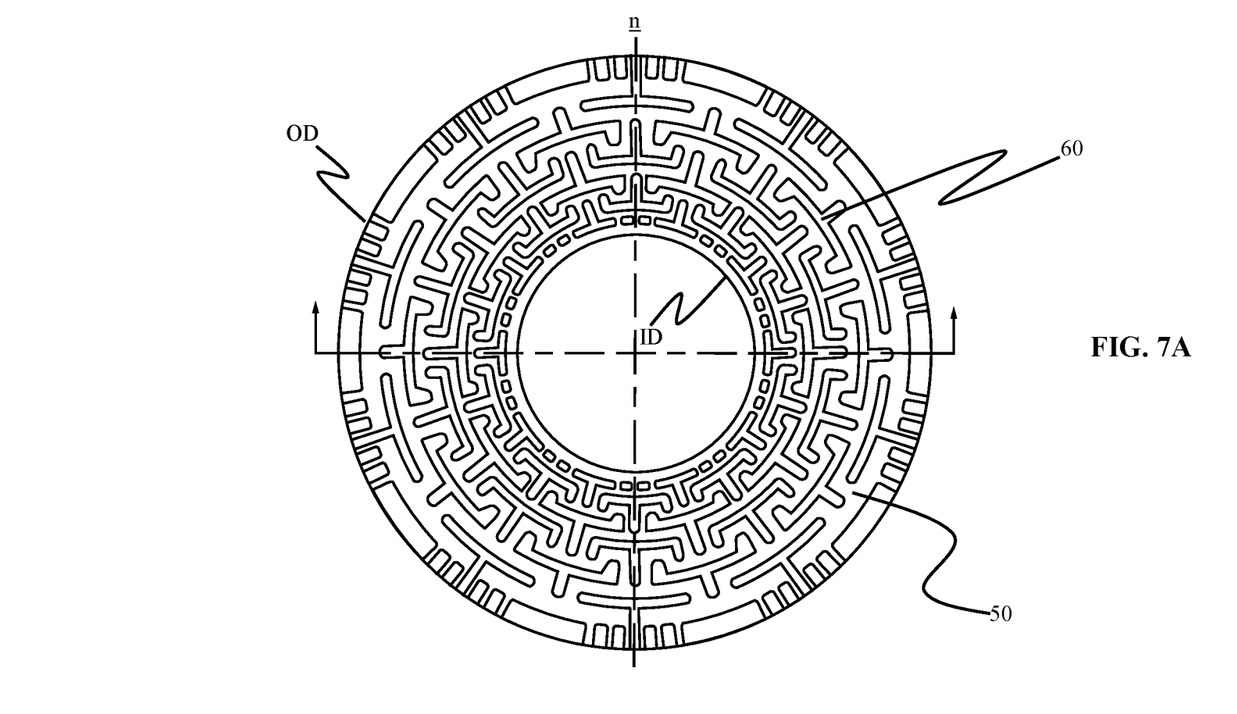
FIGS. 7A and 7B illustrate top and cross-sectional views, respectively, of a cage stack layer, in accordance with one or more embodiments.
Figure 7B:
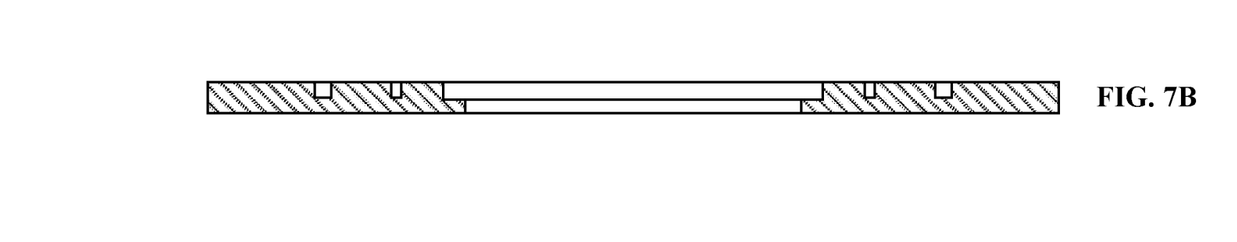

FIG. 7A depicts a top view of layer n, n being any natural number. In this example, channels 50 extend from ID to OD such that obstacles 60 are to be encountered by an ingress fluid. A cross section of layer n is depicted in the example of FIG. 7B.

Figure 8A:
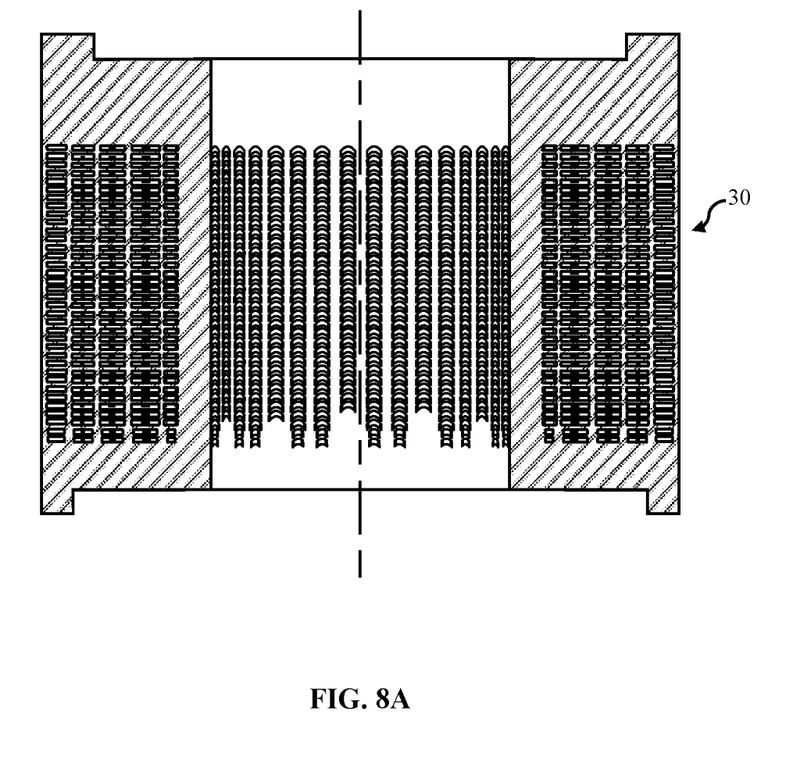
FIGS. 8A, 8B, and 8C respectively illustrate cross-sectional, top, and isometric views of a 3D-printed cage, in accordance with one or more embodiments.
Figure 8B:
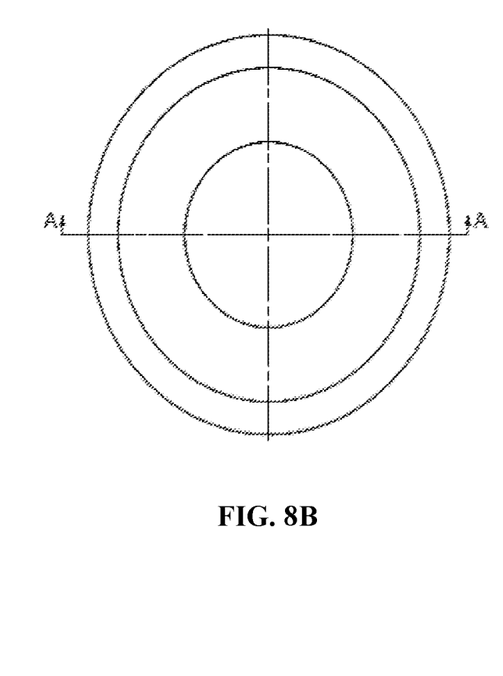
Figure 8C:
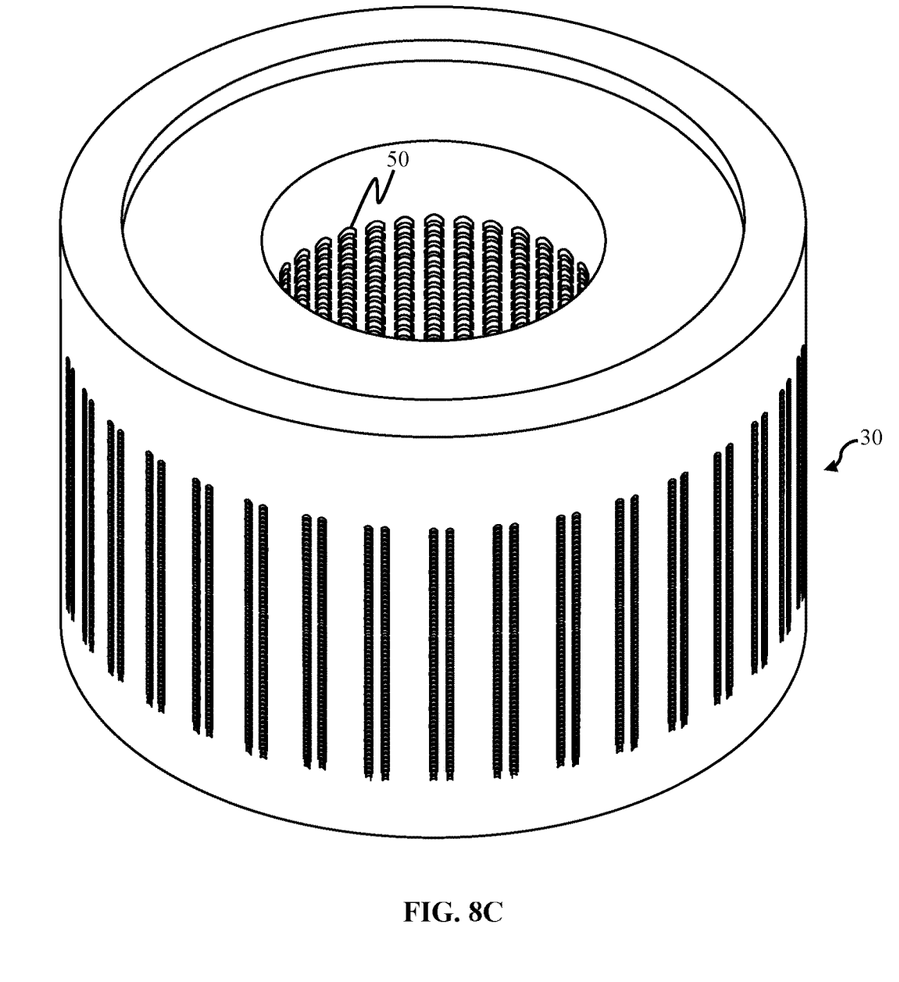

FIG. 8B depicts a top view of cage 30, FIG. 8A being a cut at the A-A line of FIG. 8B. And FIG. 8C is an isometric view of an example cage 30 to be 3D-printed.

Although a certain amount of layers and turns are depicted in the examples of FIGS. 7A and 8A, any amount of layers and any amount of turns is contemplated to satisfy flow requirements (e.g., pressure drop) of a particular application.

FIG. 9 depicts another 3D-printed cage 32. In this or another example, there may be a cage with a portion extending conically upwardly and another portion extending conically downwards such that a height criterion is satisfied. This cage may be additively manufacturable.

FIG. 10 depicts another, contemplated 3D-printed cage 33. This other, contemplated cage 33 has a conical shape (e.g., such that the cage is additively manufacturable), as shown in the cross-sectional view. A benefit of this conical shape is that from ID to OD there is a longer path in which more turns may be fit. The path may be, e.g., about 30% longer such that a height criterion is satisfied.

By placing the channels on an incline, such as is shown in FIGS. 9-10, cage 32, 33 may be printed vertically with the cylinder centerline perpendicular to the build plate. Doing so may eliminate the need for any supports (such as is shown in FIG. 11) while saving material, build time, and machine time. Also, a greater number of cages may be placed on the 3D printing machine. Further contemplated is a nesting of a small stack inside a much larger stack. When examining the cross-sectional area of the conical layer, one may notice that the paths take a longer distance to enter and leave cage 33 via the hypotenuse of a triangle. The designs of FIGS. 9-10 thus have the ability to include more turns in a particular layer. This means that a smaller body may be used when sizing a new valve. Any angle is contemplated, but as the incline angle approaches 0 degrees, the design approaches the fit, form, and function of a rectangular channel cross section.

It is important to keep in mind that any notion of disks is abstract for these embodiments, as all layers are integral to the cage when using additive manufacturing. The valve plug may uncover individual paths which form a layer as the plug is lifted through the range of valve travel. The slope of the cone-shaped layer may be approximately 32 to 45 degrees or another suitable value that the used 3D printer permits. The walls of the channels, which are otherwise vertical (e.g., as depicted by walls 52 of FIG. 6), could be either normal to the layer bottom or normal to the layer centerline. Normal walls will produce channels of a rectangular cross-sectional area, while vertical channels will produce channels with a parallelogram-style cross section; either area type is contemplated herein.

FIG. 11 depicts yet another, contemplated 3D-printed cage 35, which is manufactured via supports 37. In this cage 33, the channels are rectangular and thus horizontal members may be printed by rotating the cage at an axis. That is, the supports cause there to be no unprintable horizontal members, e.g., by the printing successfully preventing one or more printed layers n from collapsing.

Figure 12:
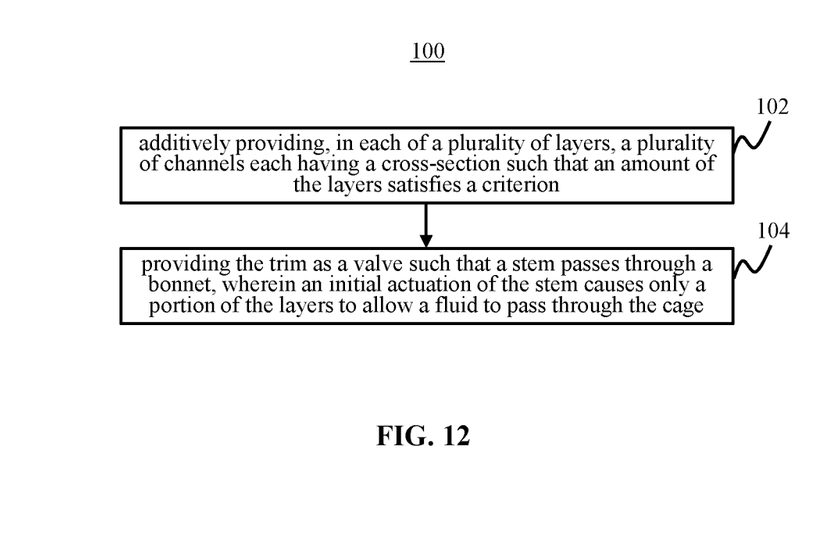
FIG. 12 illustrates a process for manufacturing a stack trim and providing the trim in a valve, in accordance with one or more embodiments.

FIG. 12 illustrates method 100 for manufacturing a layered cage of a trim, in accordance with one or more embodiments. The operations of method 100 presented below are intended to be illustrative. In some embodiments, method 100 may be accomplished with one or more additional operations not described, and/or without one or more of the operations discussed. Additionally, the order in which the operations of method 100 are illustrated in FIG. 12 and described below is not intended to be limiting.

At operation 102 of method 100, a plurality of channels each having a cross-section may be additively provided, in each of a plurality of layers, such that an amount of the layers satisfies a criterion. As an example, the cross-section of channels 50 may have a flat bottom such that the cross-section increases with respect to other channel cross sections having a top and bottom with an acute angle. In this or another example, the satisfaction of the criterion may be based on an overall volume of the cage design being less than another trim, the other trim being replaced responsive to this additive manufacturing; for example, (i) a vertical length of the trim may be shorter than a vertical length of the other trim or (ii) a horizontal width from ID to OD of the trim may be less than a horizontal width of the other trim. And channels of the other trim may have another cross section through which a same or smaller fluid area is operable to pass. In some embodiments, operation 102 is performed via a 3D printer.

At operation 104 of method 100, the trim may be provided as a valve such that a stem passes through a bonnet, wherein an initial actuation of the stem causes only a portion of the layers to allow a fluid to pass through the cage. As an example, due to channels 50 of a first layer (e.g., layer n) of cage 30 not intersecting with channels 50 of another layer (e.g., layer n+1, n−1, or any other layer) of cage 30, better control of a valve may be performed when these layers directly stack on top of one another. More particularly, channels of the first layer may include horizontal direction changes within a same plane but include no vertical direction changes outside of this plane.

Several embodiments of the disclosure are specifically illustrated and/or described herein. However, it will be appreciated that modifications and variations are contemplated and within the purview of the appended claims.

What is claimed is:

1. A system, comprising:
a plurality of layers in a first trim, each of the layers comprising a plurality of channels,
wherein each of the channels has a cross section such that an amount of the layers satisfies a criterion,
wherein the cross section is defined by vertical walls, angular portions that extend from the walls, and a rounded top that intersects with the angular portions,
wherein the channels of a first of the layers do not intersect with any other channel of any other layer of the first trim, and
wherein the channels and layers are provided via additive manufacturing.

2. The system of claim 1, wherein the cross section is further defined by at least one of a flat, angled, and curved bottom.

3. The system of claim 1, wherein a first overall volume of the first trim is greater than a second overall volume of a second trim, and
wherein the second trim is replaced via the additive manufacturing.

4. The system of claim 1, wherein the first trim is fitted into a valve that reduces at least one of cavitation, erosion, noise, vibration, flow velocity, and pressure by an amount that satisfies a criterion.

5. The system of claim 1, wherein the channels of the first layer include (i) horizontal direction changes within a same plane and (ii) no vertical direction changes outside of the plane or (i) no horizontal direction changes within a same plane and (ii) vertical direction changes outside of the plane.

6. The system of claim 1, wherein the layers are stacked directly on top of one another.

7. The system of claim 1, wherein the rounded top comprises a portion of a circle having a predetermined radius.

8. The system of claim 1, further comprising:
a stem of a valve that passes through a bonnet, wherein an initial actuation of the stem causes only a portion of the layers to allow a fluid to pass through the cage.

9. The system of claim 1, wherein the system is manufactured additively such that a series of layers is formed using a laser that melts powdered material.

10. The system of claim 2, wherein the satisfaction of the criterion is based on a vertical length of the first trim being shorter than a vertical length of a second trim, the further definition of the cross section comprising the flat bottom, and
wherein channels of the second trim have another cross section through which a same or smaller fluid area is operable to pass, a bottom of the other cross section not being flat.

* * * * *